United States Patent [19]
Leibholz et al.

[11] Patent Number: 6,122,728
[45] Date of Patent: Sep. 19, 2000

[54] TECHNIQUE FOR ORDERING INTERNAL PROCESSOR REGISTER ACCESSES

[75] Inventors: Daniel Lawrence Leibholz, Cambridge; Sharon Marie Britton, Westboro; James Arthur Farrell, Harvard, all of Mass.; Timothy Charles Fischer, Longmont, Colo.

[73] Assignee: Compaq Computer Corporation, Houston, Tex.

[21] Appl. No.: 09/017,297

[22] Filed: Feb. 2, 1998

[51] Int. Cl.[7] .............................. G06F 9/38; G06F 9/305
[52] U.S. Cl. .................... 712/219; 712/231; 712/244; 712/206
[58] Field of Search ...................... 712/219, 239, 712/240, 235, 231, 206, 23, 32, 244, 214, 216, 218, 24, 201, 215, 233

[56] References Cited

U.S. PATENT DOCUMENTS 5,805,849  9/1998  Jordan et al. ............................. 712/214
5,809,325  9/1998  Hinton et al. ............................. 712/32

OTHER PUBLICATIONS

Gieseke, Bruce A., et al. "A 600MHz Superscalar RISC Microprocessor With Out-of-Order Execution", *ISSCC 97*, Feb. 1997.

Gwennap, Linley, "Digital 21264 Sets New Standard Clock Speed, Complexity, Performance Surpass Records, But Still a Year Away", *Microprocessor Report* vol. 10, Issue 14: 1–11 Oct. 28, 1996.

Keller, Jim, "The 21264: A Superscalar Alpha Processor With Out-of-Order Execution", Microprocessor Forum, Oct. 1996.

Gieseke, Bruce A., et al. "FA 10.7: A 600Mhz Superscalar RISC Microprocessor with Out-Of-Order Execution", *ISSCC 97*: 176–177, 134–135, 394–395 (1997).

*Primary Examiner*—Daniel H. Pan
*Attorney, Agent, or Firm*—Hamilton, Brook, Smith & Reynolds, P.C.

[57] ABSTRACT

A technique for processing register instructions in a pipeline data processor in which multiple instructions may be processed concurrently, and may therefore conflict with one another. Register instructions are identified with register groups indicating which processor registers are affected by the execution of the register instruction. The progress of the execution of the register instruction is then controlled depending upon the identified register groups, in order to avoid conflicts with other concurrently processed instructions.

21 Claims, 12 Drawing Sheets

| A | B | C | D |
|---|---|---|---|
| IPR1 | IPR3 | IPR5 | IPR 9 |
| IPR2 | IPR4 | IPR6 | IPR10 |
| IPR 6 | | IPR7 | |
| | | IPR8 | |

FIG. 3

TECHNIQUE FOR ORDERING INTERNAL PROCESSOR REGISTER ACCESSES

BACKGROUND OF THE INVENTION

Instruction pipelining involves splitting a processing device (or processor) into a series of stages called a pipeline. The pipeline processes a stream of instructions such that the stages may operate on portions of different instructions concurrently. For example, an execution stage that follows a decode stage may execute a first instruction that has been decoded by the decode stage, while the decode stage simultaneously decodes a second instruction. Due to the simultaneous nature of operation of the pipeline stages, processor resources are thus used efficiently.

A conflict or data hazard occurs in the pipeline when there exists a dependency between instructions that coexist in the pipeline. For example, an instruction stream may include a subtraction instruction followed by a multiply instruction. The subtraction instruction subtracts the contents of a general purpose register (GPR) R1 from the contents of another GPR R2 and places the result in a third GPR R3. The subsequent multiply instruction multiplies the contents of the GPR R3 by itself and places the result in a fourth GPR R4. A data hazard exists because the multiply instruction may attempt to operate on the contents of the GPR R3 before the subtraction instruction has finished storing its result in the GPR R3. If the multiply instruction reads the contents of the GPR R3 before the subtraction result is stored in the GPR R3, the result of the multiply instruction will be incorrect.

A conventional method for avoiding data hazards that involve GPRs is for the processor to inspect each instruction as it arrives in the instruction stream. When an instruction arrives that may cause a data hazard, the processor drains the pipeline before advancing that instruction through the pipeline. Draining the pipeline typically involves waiting for all instructions existing in the pipeline to finish.

Another conventional method for avoiding data hazards that involve GPRs is to detect such hazards at compilation time. In particular, when a compiler compiles an application (one or more programs), the compiler generates instructions in such a way that they do not include data hazards.

In addition to GPRs, some processors have special registers for controlling, and for providing status relating to, the operation of the processor hardware. These special registers are called internal processor registers (IPRs).

SUMMARY OF THE INVENTION

As with GPRs, data hazards may occur with the instructions that access IPRs. For example, an instruction stream may include a first instruction that enables a floating point unit, and a second instruction that performs a floating point operation. A data hazard exists because the second instruction may attempt the floating point operation before the first instruction has finished enabling the floating point unit. If this happens, the processor will use floating point emulation rather than the floating point unit. Floating point emulation requires substantially more time to perform a floating point operation than does the floating point unit. Accordingly, the above described data hazard can create a severe performance penalty. Other data hazards involving IPRs (IPR data hazards) can result in the processor obtaining the wrong values when performing particular operations. Therefore, IPR data hazards should be avoided.

During runtime, an instruction decode stage often inserts special instructions into the instruction stream to control and optimize the operation of the processor. The inserted instructions are often IPR instructions that access (write to or read from) the processor's IPRs. Since the IPR data hazards are created during runtime, the IPR data hazards cannot be predicted in advance at the time of compiling the application.

Typically, a processor avoids IPR data hazards in a manner similar to GPR hazards by examining the instruction stream at the point of IPR instruction insertion, and stalling each IPR instruction that would cause an IPR data hazard until the pipeline is drained. Once the pipeline has been drained, the processor allows the IPR instruction and any following instructions to again proceed through the pipeline. Unfortunately, pipeline draining imposes severe performance penalties, since many stages of the pipeline typically become inactive while the pipeline is drained. These penalties are particularly taxing on processors that regularly incorporate IPR instructions into the instruction stream at runtime.

Superscaler processors, which are processors that are capable of issuing multiple instructions simultaneously to multiple execution units, require substantial additional logic to detect each IPR data hazard, and subsequently drain the pipeline.

Furthermore, semiconductor area is precious such that designers wish to avoid dedicating large amounts of semiconductor area to logic for handling these IPR data hazards.

The present invention involves assigning IPRs to groups, and processing register instructions in a data processor. In particular, the data processor receives a register instruction, identifies which groups will be affected by executing the register instruction, and controls the progress of the execution of the register instructions according to the identified groups.

An embodiment of the invention is directed to a method for processing register instructions in a data processor in which multiple instructions may be processed concurrently, and may therefore conflict with one another. The method includes the steps of receiving a register instruction, and identifying which of a plurality of register groups to which the register instruction is assigned. Each register group includes processor registers that are affected by the execution of the register instruction. The method further includes a step of controlling the progress of the execution of the register instruction depending upon the identified register groups for the register instruction, in order to avoid conflicts with other concurrently processed instructions.

Another embodiment of the invention is directed to a data processor for processing register instructions in which multiple instructions may be processed concurrently, and may therefore conflict with one another. The data processor includes a decoding circuit, for receiving a register instruction and identifying which of a plurality of register groups to which the register instruction is assigned. Each register group includes processor registers that are affected by the execution of the register instruction. The data processor further includes an instruction ordering circuit, for controlling the progress of the execution of the register instruction depending upon the identified register groups for the register instruction, in order to avoid conflicts with other concurrently processed instructions.

According to an embodiment of the invention, the data processor can identify multiple register groups for a register instruction from the plurality of register groups.

According to an embodiment of the invention, the data processor is adapted to compare the identified register groups with register groups affected by the other concurrently processed instructions to determine one or more affected register groups; delay the execution of the register instruction when a match exists between the identified register groups and the affected register groups; and execute the register instruction when no match exists between the identified register groups and the affected register groups.

According to an embodiment of the invention, the register instruction writes to an internal processor register when executed. The data processor is adapted to notify subsequently received register instructions when the identified register groups are affected by the execution of the register instruction. In particular, the register instruction writes to a latch, and the contents of the latch subsequently are moved to the internal processor register.

According to an embodiment of the invention, the register instruction reads from an internal processor register when the register instruction is executed. The data processor notifies subsequently received register instructions that write to internal processor registers when the identified register groups are affected by the execution of the register instruction.

There are advantages provided by the invention. For example, IPR data hazards are avoided without draining the pipeline and paying a performance penalty for draining the pipeline. Additionally, the amount of logic used is reduced over that for controlling the progress of IPR instructions without group assignments.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a chart of IPR groups, and IPR instructions that are assigned to the IPR groups.

DETAILED DESCRIPTION OF THE INVENTION

The present invention involves a technique for handling instructions that access internal processor registers (IPRs) in a data processor. The data processor is implemented using an instruction pipeline of multiple stages such that multiple instructions may be processed concurrently. Accordingly, the execution of certain types of instructions in a particular order may cause data hazards with one another. To avoid conflicts between concurrent IPR instructions, the data processor's IPRs are assigned to a plurality of groups of registers. When the data processor receives an IPR instruction, the data processor identifies which of the groups are affected by the execution of that IPR instruction. The data processor then controls the progress of the execution of that IPR instruction through the pipeline based on the identified groups.

Figure 1:
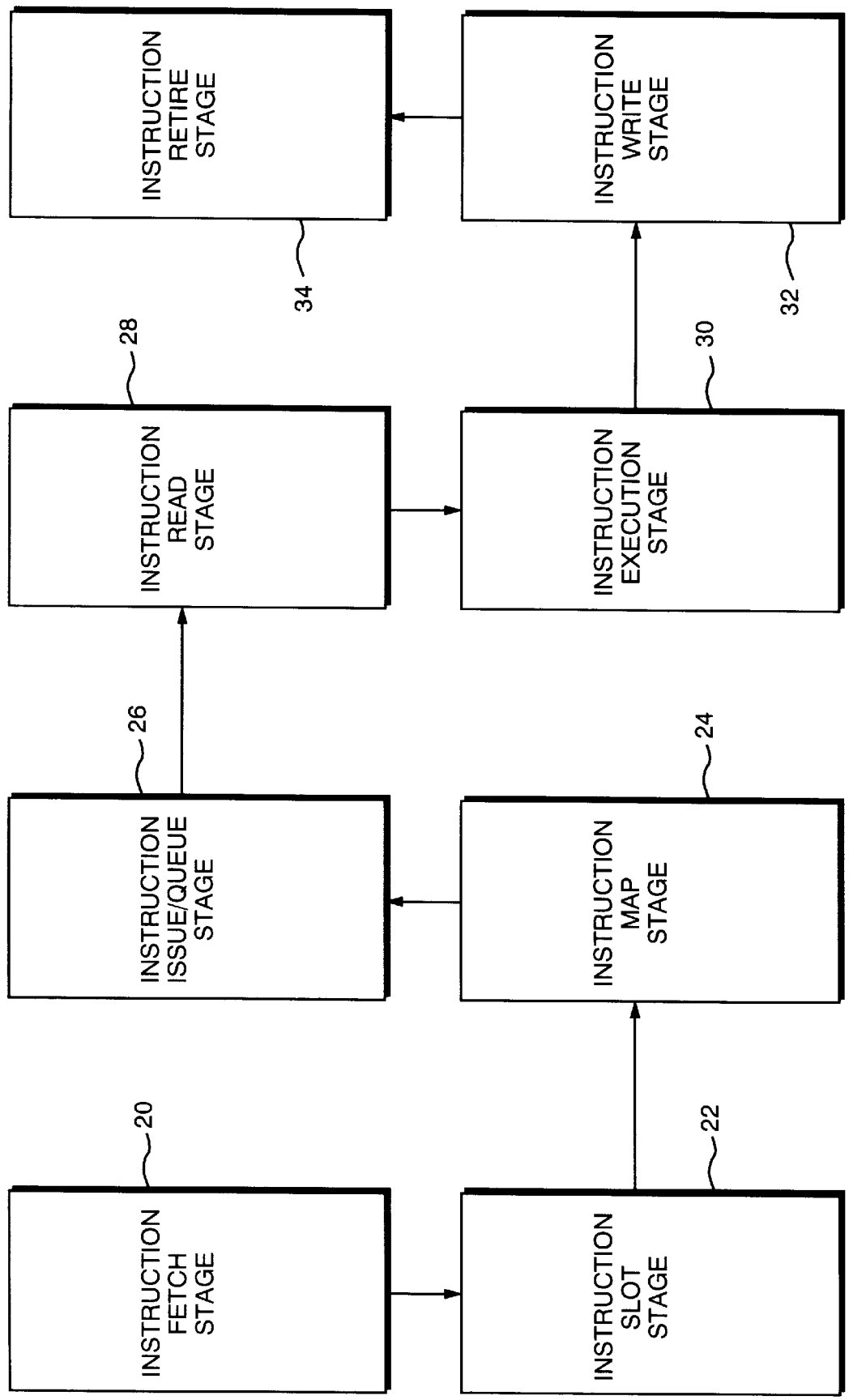
FIG. 1 is a block diagram of an instruction pipeline for a data processor in which the present invention may be used.

An instruction pipeline that is suitable for the invention is shown in FIG. 1. First, an instruction fetch stage 20 retrieves instructions from an instruction cache (not shown). Second, an instruction slot stage 22 determines to which execution unit the fetched instructions should be sent, e.g., a floating point unit or an integer unit (not shown). Third, an instruction map stage 24 maps virtual registers accessed by the instructions to physical general purpose registers (GPRs) in the processor. Fourth, an instruction issue/queue stage 26 queues the instructions for execution. Fifth, an instruction read stage 28 reads data used by the instructions from the physical GPRs. Next, an instruction execution stage 30 executes the instructions. Subsequently, an instruction write stage 32 stores results of the executed instructions into the physical GPRs. Finally, an instruction retire stage 34 retires the instructions by committing the processor state to the results of the operation.

Figure 2:
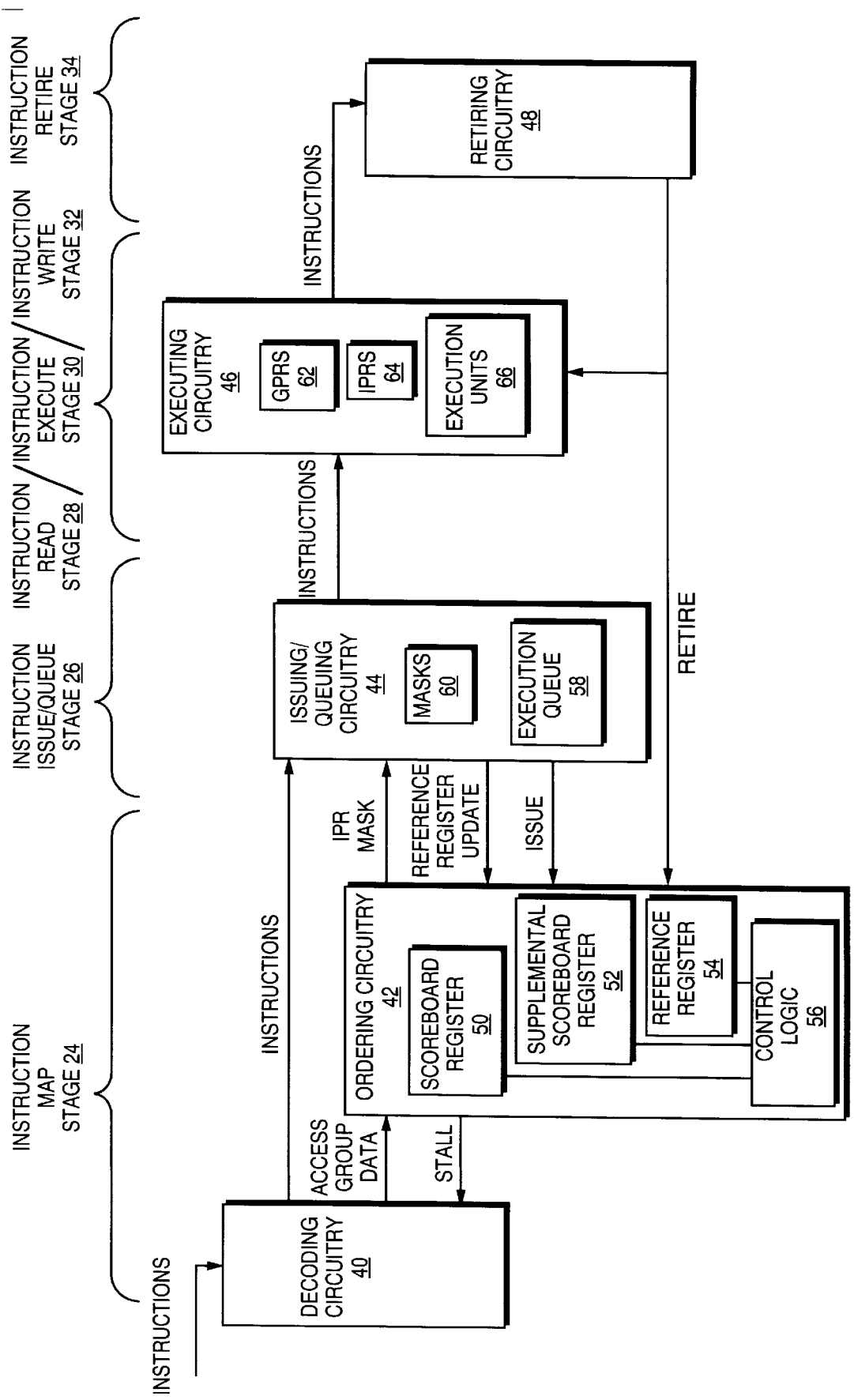
FIG. 2 is a block diagram of particular stages and circuits of the pipeline shown in FIG. 1.

A more detailed view of particular stages of the pipeline is shown in FIG. 2. In particular, the instruction map stage 24 includes decoding circuitry 40 and ordering circuitry 42. The instruction issue/queue 26 includes issuing/queuing circuitry 44. The instruction read stage 28, the instruction execute stage 30 and the instruction write stage 32 are formed by executing circuitry 46. The instruction retire stage 34 includes retiring circuitry 48.

The decoding circuitry 40 is coupled to the ordering circuitry 42 and the issuing/queuing circuitry 44. The ordering circuitry 42 is coupled further to the issuing/queuing circuitry 44 and the retiring circuitry 48. The issuing/queuing circuitry 44 is coupled further to the executing circuitry 46. The executing circuitry 46 is coupled further to the retiring circuitry 48.

The ordering circuitry 42 includes a scoreboard register 50, a supplemental scoreboard register 52 and a reference register 54. The ordering circuitry further includes control logic 56 that is coupled to the scoreboard register 50, the supplemental scoreboard register 52 and the reference register 54. The ordering circuitry 42 is adapted to control the advancement and the execution of IPR instructions in the instruction stream. IPR instructions are those which control certain functions of the processor or permit checking of the status of certain conditions. For example, there are IPR instructions that enable or disable certain types of interrupts. As another example, there are IPR instructions that obtain information about the data processor hardware such as a version or a serial number of the data processor.

The issuing/queuing circuitry 44 includes an execution queue 58 and masks 60. The issuing/queuing circuitry 44 is adapted to store (i.e., queue) instructions in the execution queue 58 temporarily, delay instructions until they are ready for execution, and output instructions to the executing circuitry 46 when they are ready for execution. The issuing/queuing circuitry 44 applies an arbitration scheme when selecting instructions to output so that each instruction ready for execution is provided an opportunity to execute. In particular, the issuing/queuing circuitry 44 applies a bottom-up approach such that the oldest instructions (i.e., instructions at the bottom of the queue) are typically output first when they are ready for execution.

The executing circuitry 46 includes GPRs 62, IPRs 64, and execution units 66. The IPRs 64 control the operation of the data processor and provide status relating to the operation of the data processor. The execution units 66 preferably include multiple integer execution units and multiple floating point execution units.

The IPRs 64 are assigned to logical IPR access groups (or groups). FIG. 3 shows ten IPRs (numbered IPR1 through IPR10) that are used for controlling the operation of the data processor and for providing operation status. For example, IPR1 may be a floating point control IPR for controlling the floating point operation of the data processor. The IPRs are assigned to four IPR groups A, B, C and D. Each IPR is assigned to at least one group, and an IPR can be assigned to more than one group. As shown in FIG. 3, IPR1, IPR2 and IPR6 are assigned to IPR group A. IPR3 and IPR4 are assigned to IPR group B. IPR5, IPR6, IPR7 and IPR8 are assigned to IPR group C. IPR9 and IPR10 are assigned to IPR group D. It should be understood that IPR 6 is assigned to multiple IPR groups, i.e., IPR groups A and B.

IPRs that are often accessed simultaneously (e.g., an interrupt priority mask IPR and a process state IPR) are assigned to different groups. On the other hand, IPRs that are rarely or never accessed at the same time (e.g., an interrupt priority mask IPR and a performance counter IPR) can be assigned to the same group.

It should be understood that each IPR instruction accesses a particular IPR when executed. Since IPR instructions access particular IPRs, and since IPRs are assigned to logical IPR access groups, the IPR instructions themselves can also be viewed as being assigned to the logical IPR access groups. That is, each IPR instruction can be viewed as being assigned to the same group as the particular IPR accessed by that IPR instruction. Furthermore, since IPRs can be assigned to more than one group, an IPR instruction that accesses an IPR assigned to multiple groups can be viewed as being assigned to the same multiple groups.

Figure 4:
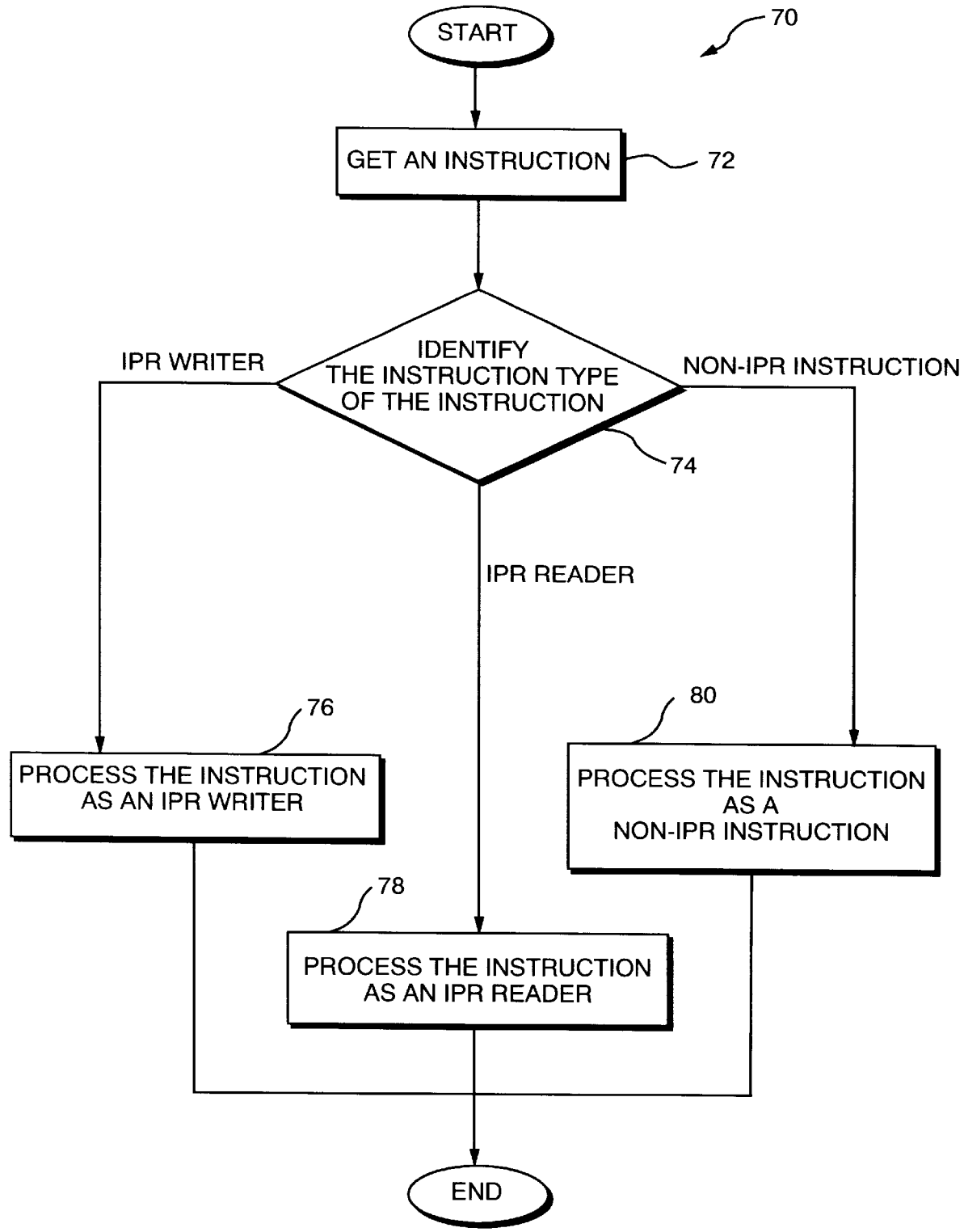
FIG. 4 is a flow diagram of a method for processing instructions performed by the pipeline shown in FIG. 1.

The operation of the data processor with respect to handling IPR instructions will now be described in further detail. The data processor processes instructions by performing a method 70 as shown in FIG. 4. Preferably, logic circuits are used to implement the method 70.

In step 72, the instruction fetch stage 20 obtains an instruction from an instruction cache, and assigns an instruction number (or "inum") to the instruction which allows its status to be tracked as it progresses down the pipeline. In step 74, the instruction slot stage 22 determines what type of instruction has been fetched. In particular, the instruction slot stage 22 identifies the instruction as an IPR writer that writes data to an IPR of the executing circuitry 46, an IPR reader that reads data from an IPR of the executing circuitry 46, or a non-IPR instruction. If the instruction is identified as an IPR writer, the remaining stages process the instruction in step 76. Similarly, if the instruction is identified as an IPR reader, the remaining stages process the instruction in step 78. If the instruction is identified as a non-IPR instruction, the remaining stages process the instruction in step 80.

Figure 5:
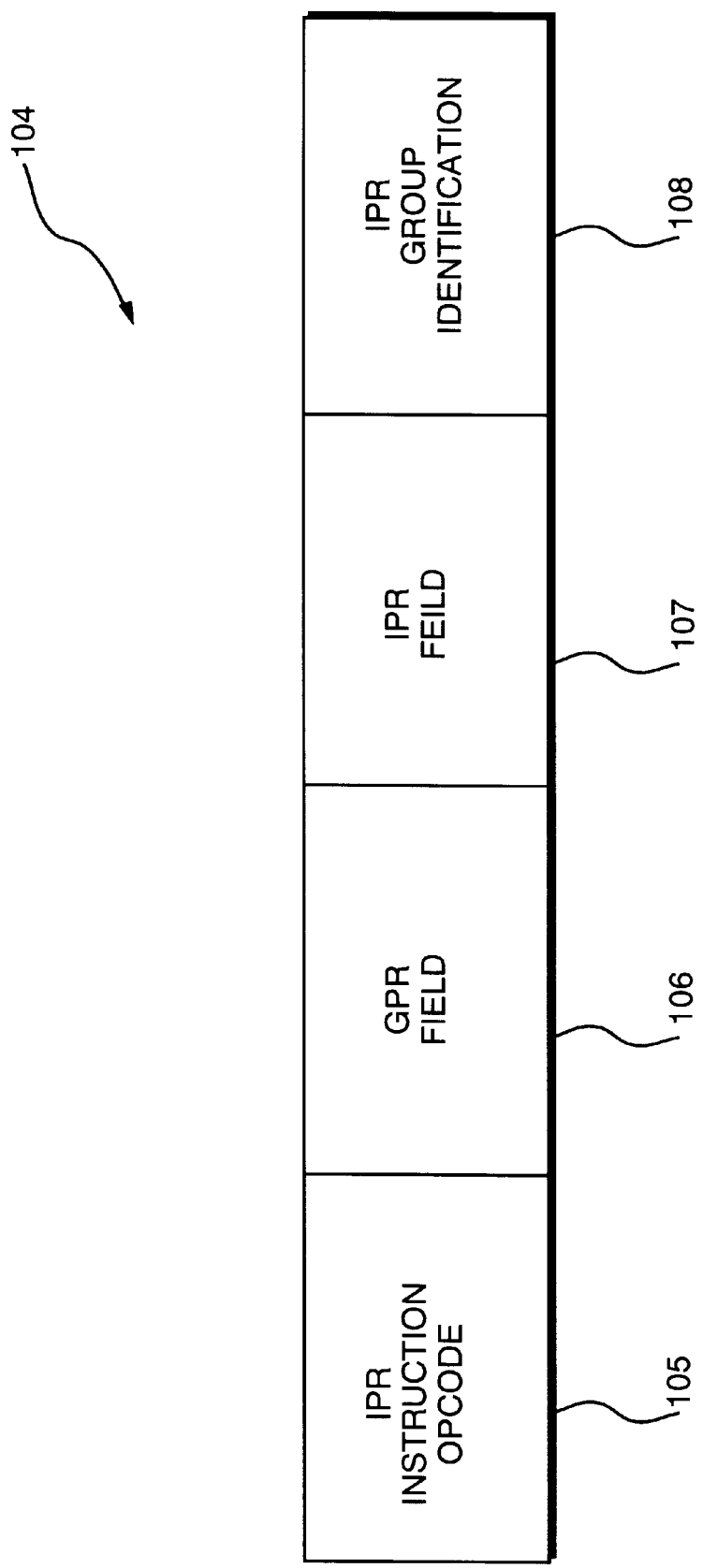
FIG. 5 is a diagram of an IPR instruction that can be processed by the pipeline shown in FIG. 1.

IPR instructions (IPR writers and IPR readers) have a special layout 104 as shown in FIG. 5. In particular, IPR instructions include an IPR instruction opcode 105, a GPR field 106 and an IPR field 107. IPR writers further include an IPR group identification number field 108. Optionally, an IPR reader can include an IPR group identification number field 108 as well. The IPR instruction opcode 105 indicates the IPR operation to be performed when executing the IPR instruction. The GPR field 106 identifies any GPRs used when executing the IPR instruction. Similarly, the IPR field 107 identifies any IPRs used when executing the IPR instruction. The IPR group identification field 108 identifies the groups that would be accessed by executing the IPR writers.

Figure 6:
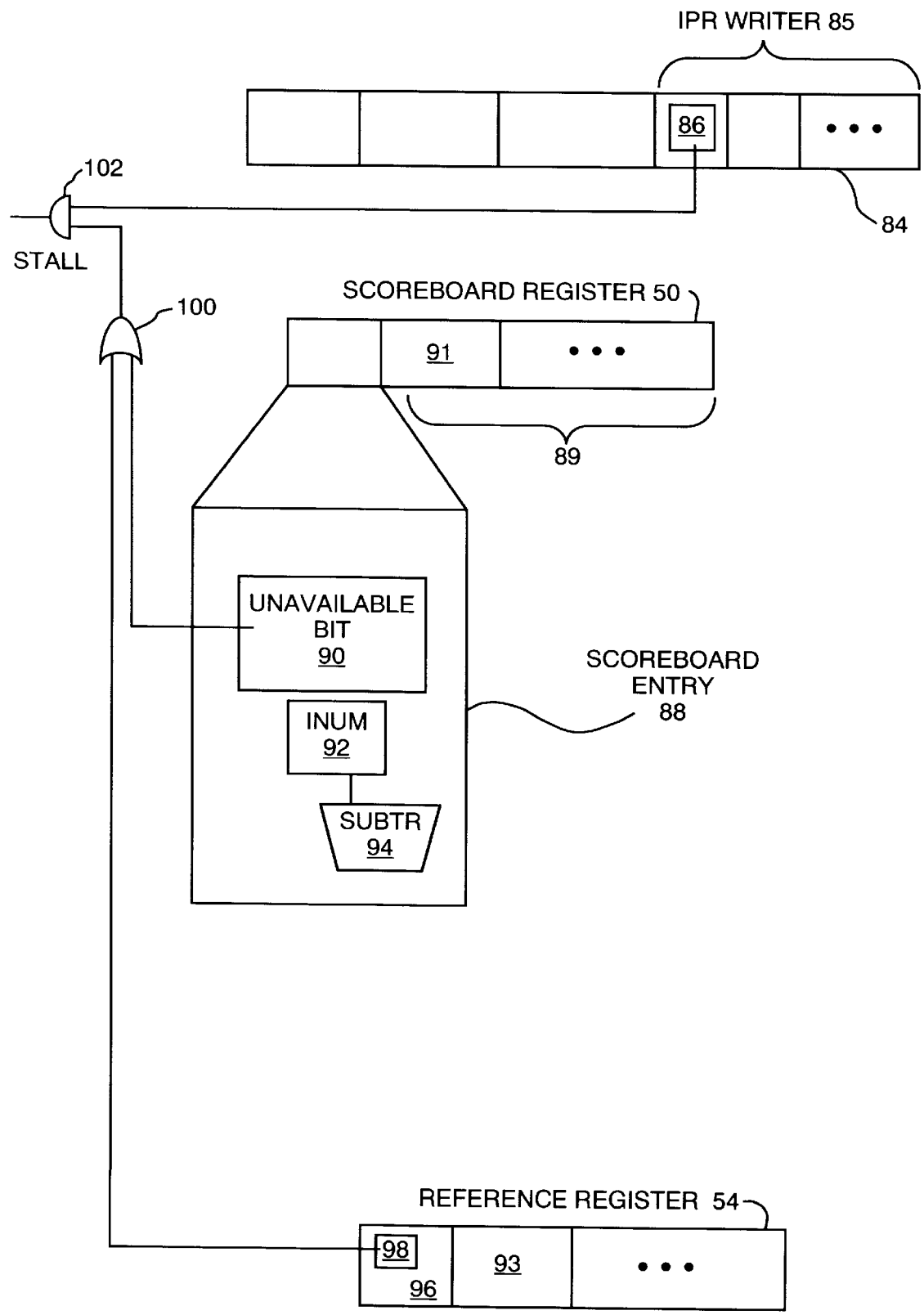
FIG. 6 is a block diagram of a portion of the data processor used when processing an IPR writer.

Steps 76 and 78, which involves the operation of the data processor with respect to handling IPR instructions, will now be described in further detail. As the data processor processes IPR instructions through the pipeline, the control logic 56 of the ordering circuitry 42 updates the contents of the scoreboard register 50, the supplemental scoreboard register 52 and the reference register 54, and uses the contents of these registers to control advancement of the IPR instructions through the pipeline. FIG. 6 shows that a first entry 88 of the scoreboard register 50 includes an unavailable bit 90, an inum field 92 and some associated logic 94 (e.g., a subtractor 94). The other scoreboard entries 89 are similarly structured. The first entry 96 of the reference register 54 includes an unavailable bit 98. The other reference entries (e.g., reference entry 93) are similarly structured.

The entries of the scoreboard register 50 and the reference register 54 correspond with the logical IPR access groups. That is, the first entries 88,96 of the scoreboard and reference registers 50,54 correspond with a first IPR access group (e.g., IPR group A), the second entries 91,93 of the scoreboard and reference registers 50,54 correspond with a second IPR access group (e.g, IPR group B), and so on.

When the unavailable bit 90 of a scoreboard entry 88 is set, an IPR writer assigned to the group corresponding to that scoreboard entry has advanced in the pipeline past the decoding circuitry 40. Similarly, when the unavailable bit of a reference entry is set, an IPR reader assigned to the group corresponding to that reference entry has advanced further down the pipeline. The processes for handling IPR writers and IPR readers, suitable for steps 76 and 78 of FIG. 4, will now be discussed in further detail.

Figure 7:
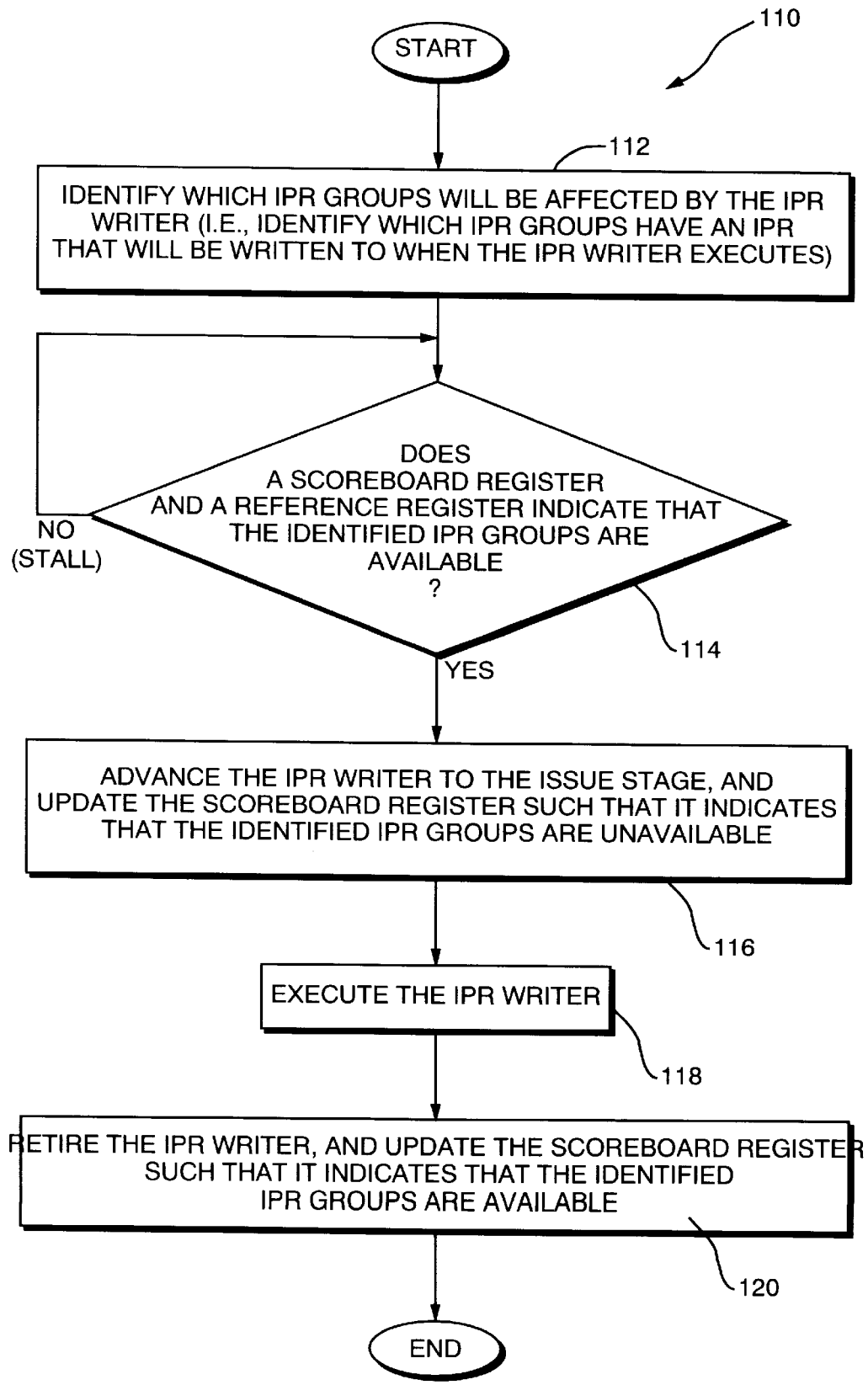
FIG. 7 is a flow diagram of a method for processing the IPR writer shown in FIG. 6.

FIG. 7 shows a method 110 performed by the data processor when processing an IPR writer such as the IPR writer 84 shown in FIG. 6. In step 112, the decoding circuitry 40 receives the IPR writer 84, identifies which groups will be affected when the IPR writer 84 is executed (i.e., which logical IPR access groups are assigned an IPR that will be accessed when the IPR writer 84 is executed), and sets the IPR group identification field 85 of the IPR writer 84 to identify the groups that would be affected. In particular, each bit (e.g. bit 86) of the IPR group identification field 85 corresponds with one of the IPR access groups (e.g., IPR group A of FIG. 3) in a manner similar to that of the entries of the scoreboard and reference registers 50 and 54. The decoding circuitry 40 sets the bits of the IPR group identification field 108 corresponding with the groups that would be affected.

In step 114, the data processor determines whether the identified groups are available for use by the IPR writer 84, i.e., whether there is another IPR instruction further down the pipeline that is assigned to the same group as the IPR writer 84. In particular, the control logic 56 combines the unavailable bits 90,98 of the first scoreboard entry 88 and the first reference entry 96 using a logical OR operation 100, and compares the result with the first bit 86 of the IPR writer's IPR group identification field 85 using a logical AND operation 102. These operations are performed for the other entries as well to determine if there are any conflicts between the IPR writer 84 and other IPR instructions further down the pipeline. The result of one of the logical AND operations will be high if there is a conflict. Otherwise, no conflicts exist. If there is a conflict, the ordering circuitry 42 sends a stall signal to the decoding circuitry 40 (e.g., by sending the high output of the logical AND operation as a stall signal) to prevent the IPR writer 84 from advancing. If there are no conflicts, step 114 proceeds to step 116.

In step 116, the decoding circuitry 42 advances the IPR writer 84 to the issuing/queuing circuitry 44, which queues the IPR writer 84 in the execution queue 58. Additionally, the control logic 56 updates the scoreboard register 50 by setting the unavailable bits of the scoreboard entries corresponding with groups that would be affected by executing the IPR writer 84. Such groups are then unavailable for other IPR instructions.

In step 118, the executing circuitry 46 executes the IPR writer 84. In particular, the executing circuitry loads the contents of a register file (GPRs and IPRs), one of the execution units 46 executes the IPR writer 84, and results of the execution are stored in the register file as specified by the particular instruction.

In step 120, the retiring circuitry 48 retires the IPR writer 84. In particular, the retiring circuitry outputs a retire signal, e.g., the inum of oldest non-retired instruction in the execution circuitry, to the executing circuitry 46 and the ordering circuitry 42. When the ordering circuitry 42 receives the retire signal, the scoreboard register 50 is updated to reflect the retirement of the IPR writer 84. In particular, the subtractor associated with each scoreboard register entry compares the inum in the retire signal with the inum in the entry (i.e., the inum of the IPR instruction that caused the unavailable bit to be set), and clears the unavailable bits that were set for the IPR writer 84. For example, the subtractor 94 associated with the scoreboard entry 88 compares the inum in the retire signal with the inum 92 to determine whether to clear the unavailable bit 90. As the scoreboard and reference registers are updated, a later IPR writer that was stalled in the decoding circuitry 40 by an earlier IPR writer 84 now has an opportunity to advance.

Figure 8:
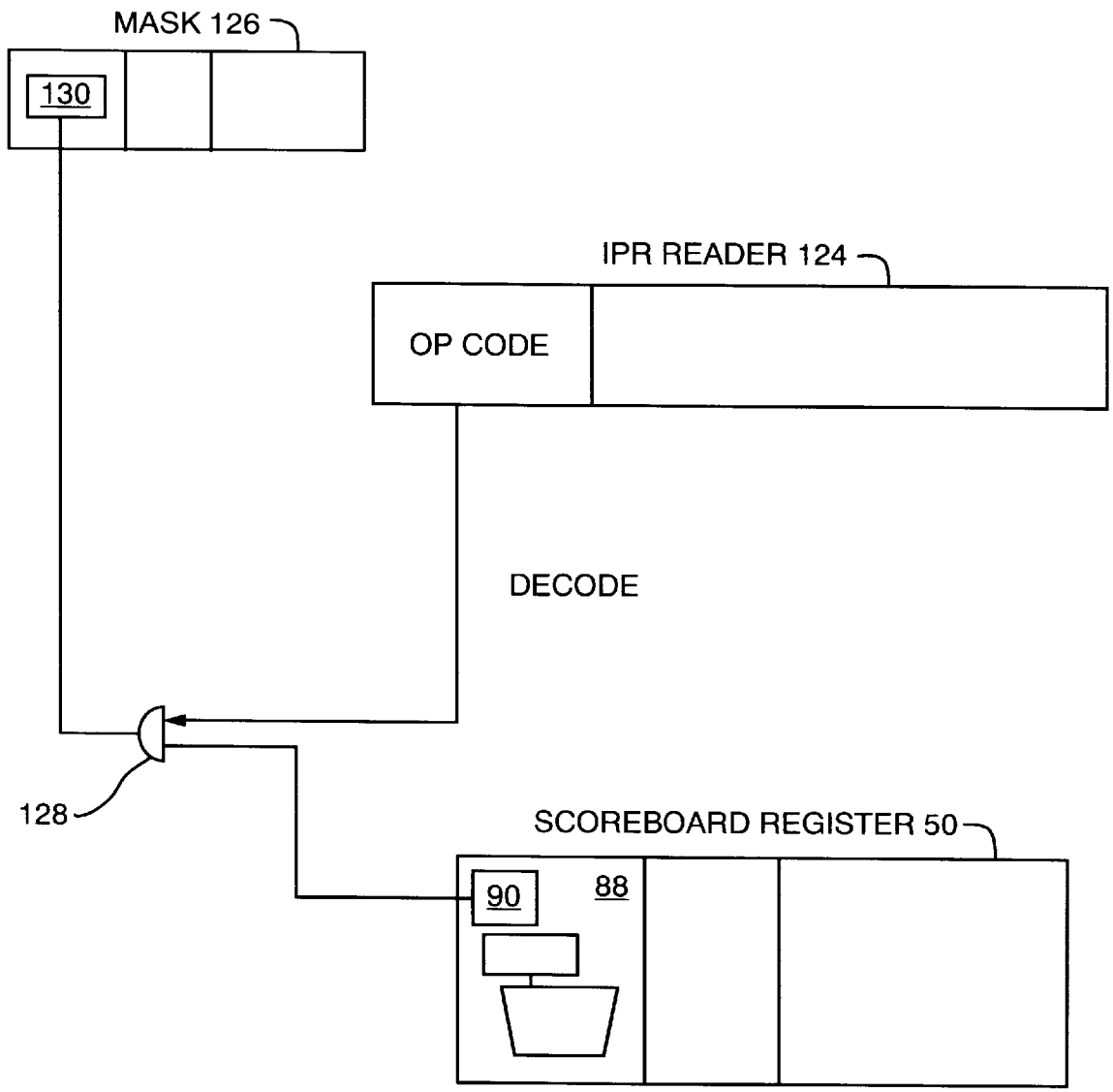
FIG. 8 is a block diagram of a portion of the data processor used when processing an IPR reader.
Figure 9:
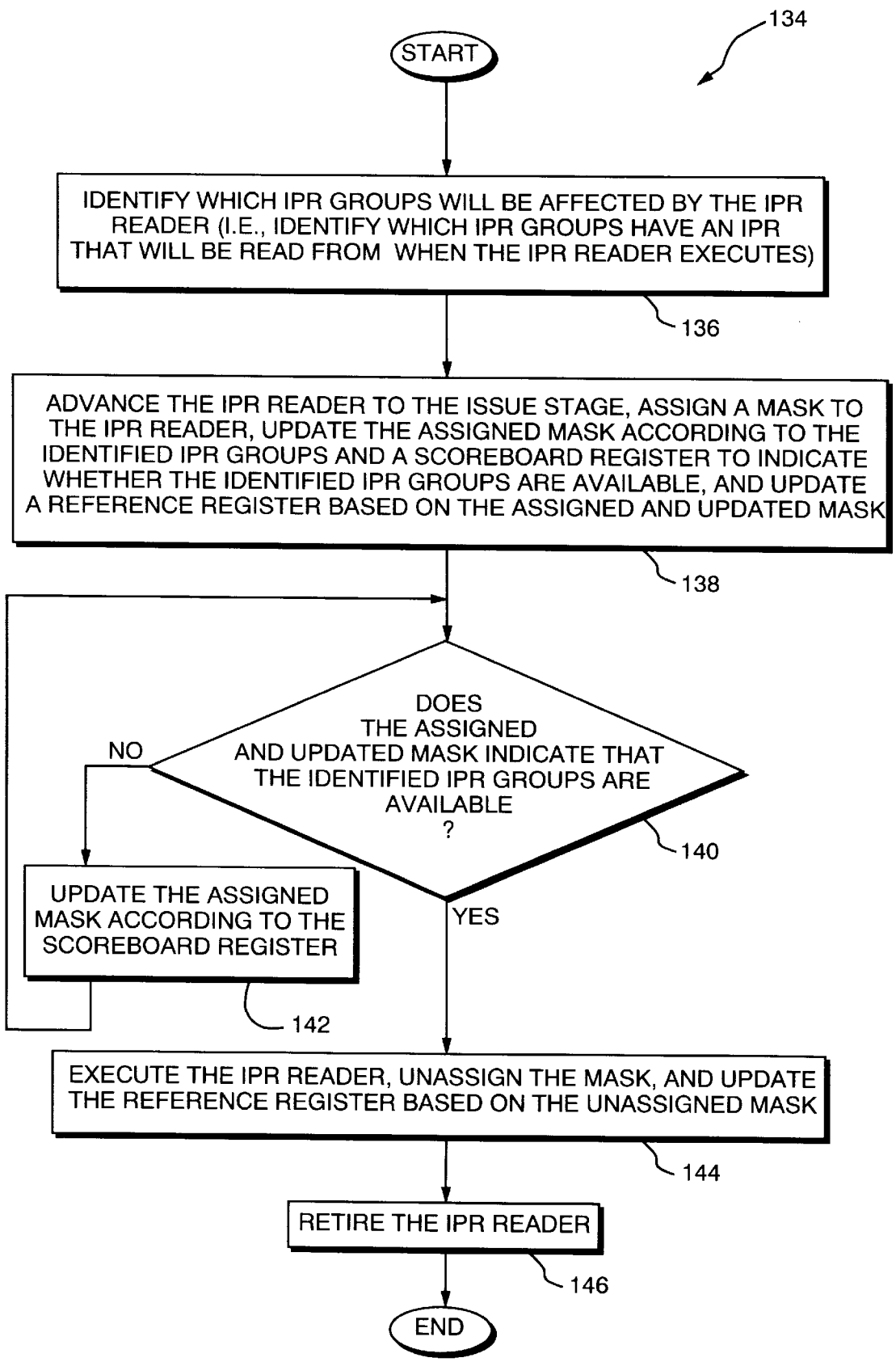
FIG. 9 is a flow diagram of a method for processing the IPR reader shown in FIG. 8.

The operation for handling IPR readers will now be described with reference to FIGS. 8 and 9. FIG. 8 shows an IPR reader 124 that is received by the decoding circuitry 40, and a mask 126 that, as will be explained below, is assigned to the IPR reader 124 from the masks 60 of the issuing/queuing circuitry 44 as the IPR reader 124 is processed. FIG. 9 shows a method 134 that is performed by the data processor when processing an IPR reader such as the IPR reader 124. In step 136, the decoding circuitry 40 identifies which IPR groups will be affected by the IPR reader when the IPR reader is executed, i.e., which IPR groups are assigned an IPR that will be read from when the IPR reader is executed. To make this identification, the decoding circuitry 42 decodes the IPR opcode of the IPR reader. For some IPR readers this identification involves accessing an IPR group identification field 108 (see FIG. 5).

In step 138, the decoding circuitry 40 advances the IPR reader 124 to the issuing/queuing circuitry 44, which adds the IPR reader 124 to the execution queue 58. Additionally, the issuing/queuing circuitry 44 assigns the mask 126 from the masks 60 to the IPR reader 124. The bits of each mask 60 correspond with the IPR access groups in a manner similar to that of the scoreboard and reference registers 50 and 54. For example, the first bit 130 of the mask 126 corresponds to the same group (e.g., IPR group A of FIG. 3) as the unavailable bit 90 of the first entry 88 of the scoreboard register 50. Each bit of the mask 126 is updated by comparing the corresponding unavailable bit of the scoreboard register with the identified groups from step 136 using a logical AND operation. FIG. 8 shows a first bit 130 of the mask 124 updated using a logical AND operation 128. Similar calculations are performed for the other bits of the mask 126. As will be discussed later, the reference register 54 is updated based on the updated mask 126.

In step 140, the issuing/queuing circuitry 44 compares any bits that are set in the mask 126 with the corresponding unavailable bits in the scoreboard register 50. If the comparison indicates that a potential conflict exists, i.e., that an IPR writer assigned to the same group exists past the instruction map stage 24 of the pipeline, step 140 proceeds to step 142.

In step 142, the bits of the mask 126 are recalculated and the mask 126 is updated. Then, step 140 is repeated.

If the comparison in step 140 indicates that there are no potential conflicts, i.e., that there are no IPR writers assigned to the same group past the instruction map stage 24 of the pipeline, step 140 proceeds to step 144. In step 144, the executing circuitry 46 executes the IPR reader 124. In particular, the executing circuitry 46 loads the contents of the register file (GPRs and IPRs), one of the execution units 46 executes the IPR reader 124, and results of the execution are stored in the register file. Additionally, the mask 126 is unassigned (i.e., freed so that it can be assigned to another IPR reader) and the reference register 54 is updated to reflect the unassignment of the mask 126.

In step 146, the retiring circuitry 48 retires the IPR reader 124. In particular, the retiring circuitry 48 outputs a retire signal in a manner similar to that for retiring the IPR writer 84.

Figure 10:
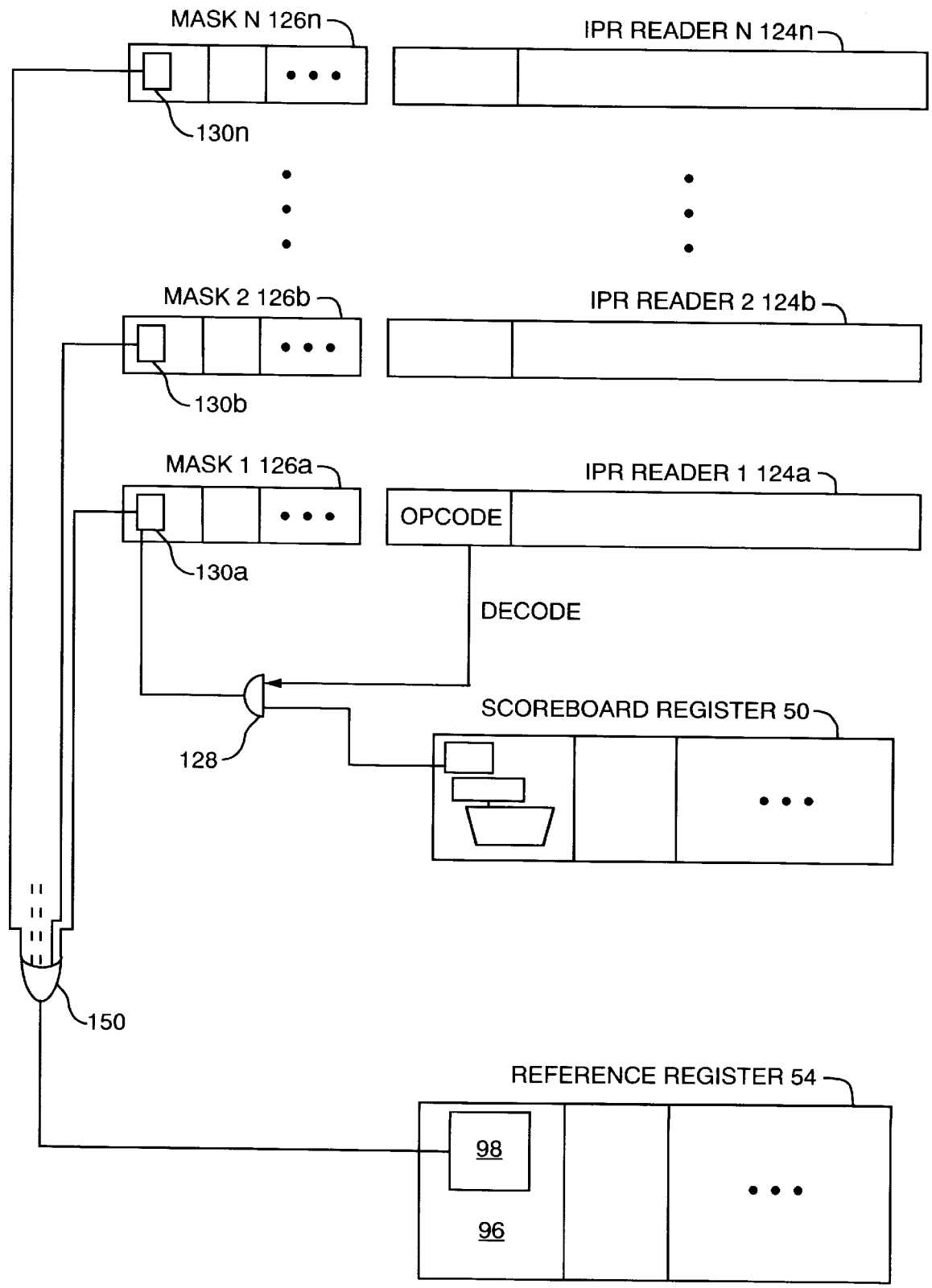
FIG. 10 is a circuit diagram of a portion of the data processor used when processing multiple IPR readers.

FIG. 10 shows how the reference register is updated. The issuing/queuing circuitry 44 tracks which of the masks 60 are assigned to IPR readers and which are unassigned. The first bit of each assigned mask is combined using a logical OR operation 150. The result is stored in the unavailable bit 98 of the first reference entry 96. The process is performed for the other bits of the reference register 54 as well.

When an IPR reader (e.g., IPR reader 124*n*) is added to the execution queue 58, the mask assigned to that IPR reader is added to the set of masks used to calculate the unavailable bits of the reference register 54. When an IPR reader is executed, the mask assigned that IPR reader is removed from the set of masks used to calculate the unavailable bits of the reference register 54. FIG. 10 shows IPR readers 124*a*–124*n* that are assigned masks 126*a*–126*n*. The assigned masks 126*a*–126*n* form the set of masks that are presently used in determining the unavailable bits of the reference register 54.

Figure 11:
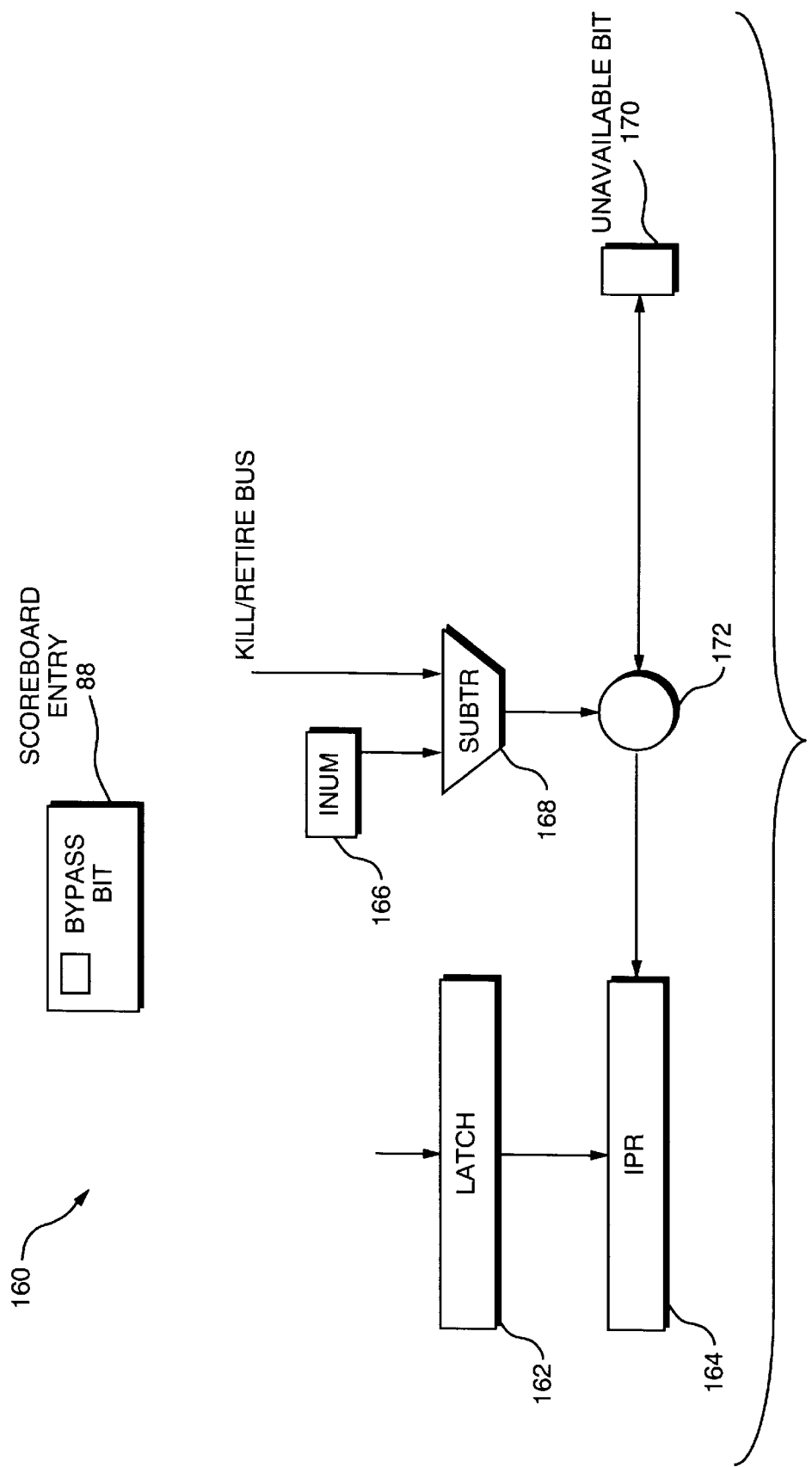
FIG. 11 is a circuit diagram of circuitry used when storing data in an IPR.

Further details of the circuitry of an IPR will now be explained. The IPRs are circuits having a master/slave configuration, as shown in FIG. 11. Each IPR circuit includes a latch 162 (master) and an IPR 164 (slave). When an IPR writer (e.g., IPR writer 84 of FIG. 6) writes to an IPR, the IPR writer 84 actually writes to the latch 162. During execution of the IPR writer 84, the inum of the IPR writer is stored in a buffer 166, and an unavailable bit 170 is set to indicate that the latch 162 has been written to, but that its contents have not yet been transferred to the IPR 164. A subtractor 168 receives the inum from the buffer 166 and the retire signal from the retiring circuitry 48. If the subtractor 168 detects that the IPR writer has been retired, the subtractor 168 causes control logic 172 to transfer the contents of the latch 162 to the IPR 164 and to clear the unavailable bit 170. On the other hand, if the subtractor 168 determines that the IPR writer 84 has been killed, such as when the IPR writer 84 executes speculatively down a bad branch path, the subtractor 168 causes the control logic 172 to prevent the IPR 164 from reading the contents of the latch 162 and to clear the unavailable bit 170.

The IPR circuit 160 shown in FIG. 11 permits instructions to execute speculatively and to quickly recover if it is determined that execution was taken down a mispredicted branch path. Additionally, the IPR circuit 160 provides for other optimizations. For example, information can be read directly from the latch 162 in order to reduce the latency between updating the IPR 164 and the execution of instructions which depend on the updated value. This operation is termed IPR bypassing. Preferably, entries of the scoreboard register further include a bypass bit as shown in FIG. 11. An IPR writer which allows bypassing will set the bypass bit rather than the unavailable bit. When the IPR writer executes, the bypass bit is cleared. If the IPR writer is killed, the bypass bit is also cleared. IPR readers calculate their assigned masks as the logical AND of the groups in the IPR reader and the logical OR of the unavailable bit and the bypass bit. If an IPR reader is dependent on an IPR which can be bypassed, it will issue after the bypass bit is cleared.

It should be understood that the appropriate unavailable bits of the scoreboard register 50 are set when an IPR writer is sent to the issuing/queuing circuitry 44, and cleared when the IPR writer is retired. For some nonstandard IPR writers that write to particular IPRs, it is preferable to set unavailable bits (e.g., bit 90) of the entries of the scoreboard register 50 when the IPR writer is sent to the issuing/queuing circuitry 44, but to clear the unavailable bits at a time other than when the IPR writer is retired. These non-standard IPR writers are called special IPR writers, and the IPRs that they write to are called special IPRs. The special IPRs and the special IPR writers are assigned to special IPR groups in a manner similar to that of the standard IPRs and IPR instructions. As will be explained further below, an IPR instruction that loads information into an page table entry is an example of an IPR instruction that is preferably implemented as a special IPR instruction.

Figure 12:
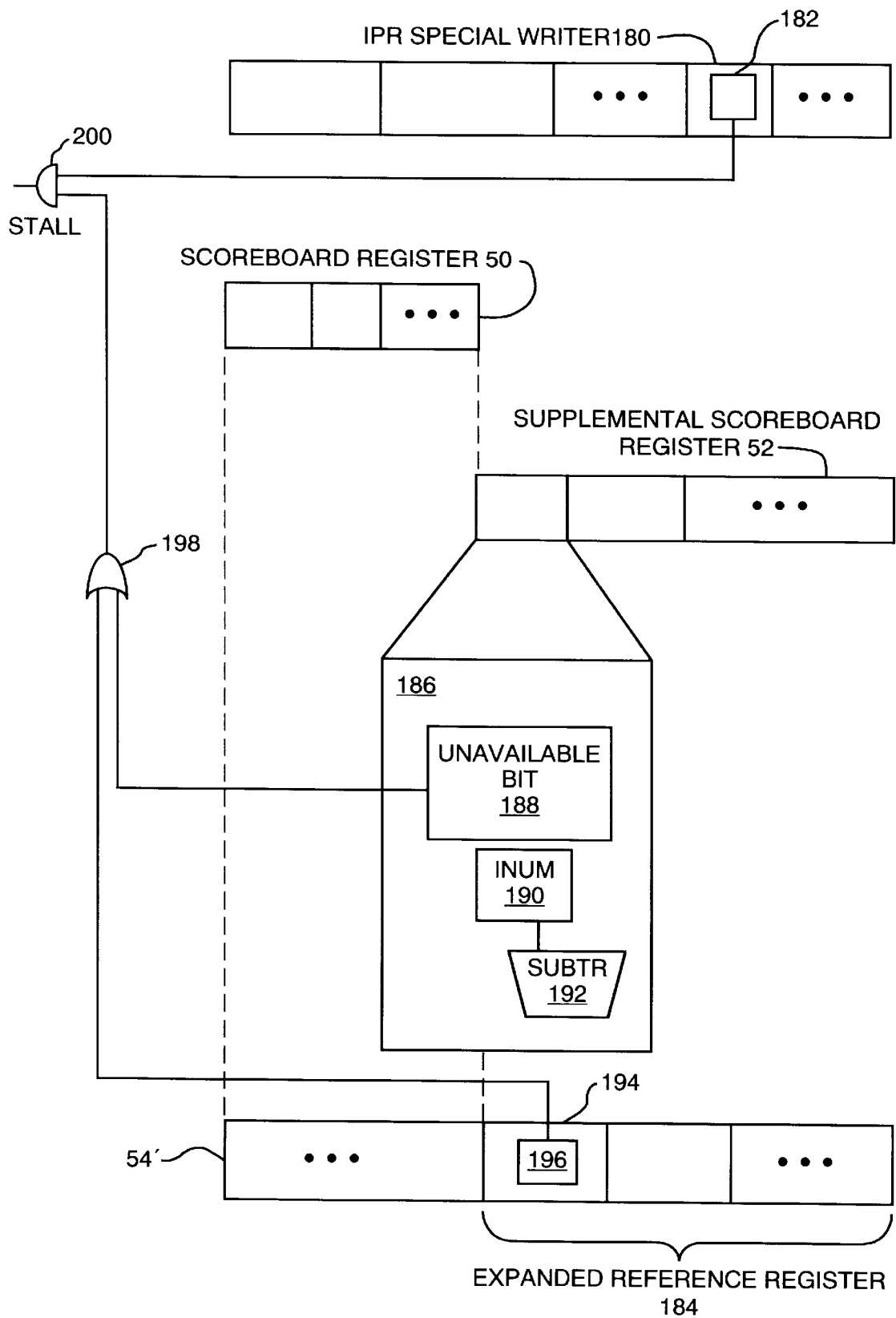
FIG. 12 is a circuit diagram of additional data processor circuitry used when processing special IPR instructions.

The ordering circuitry 42 tracks special IPR writers using the supplemental scoreboard register 52 rather than the scoreboard register 50. FIG. 12 shows a special IPR writer 180 and certain portions of the ordering circuitry 42 involved in controlling the advancement of special IPR writers in the pipeline. The special IPR writer 180 has an IPR group identification field that identifies the special IPR groups that would be affected by its execution. In particular, each bit (e.g., bit 182) of the IPR group identification field corresponds with one of the special IPR groups in a manner similar to that of standard IPR writers (e.g., see IPR writer 84 shown in FIG. 6). As shown in FIG. 12, a first entry 186 of the supplemental scoreboard register 52 includes an unavailable bit 188, an inum field 190 and some associated logic 192 (e.g., a subtractor). The other scoreboard entries are similarly structured. Also shown in FIG. 12 is the reference register 54 which is shown as being expanded to include a supplemental portion 184 that corresponds with the supplemental scoreboard register 52. The supplemental portion 184 has entries (e.g., entry 194) having unavailable bits (e.g., bit 196). The entries of the supplemental scoreboard register 52 and the supplemental portion 184 of the reference register 54 correspond with the special IPR groups. That is, the first entries of the supplemental scoreboard register 52 and the supplemental portion 184 correspond with a first special IPR group, the second entries of the supplemental scoreboard register 52 and the supplemental portion 184 correspond with a second special IPR group, and so on. Logical OR operations (e.g., OR 198) and logical AND operations (e.g., 200) combine register bits and compare results of the combination with the bits of the special IPR writer 180 in a manner similar to that of the standard IPR writer 84 to determine whether to advance the special IPR writer from the decoding circuitry 40 to the issuing/queuing circuitry 44.

The entries of the supplemental scoreboard register 52 are set in a manner similar to that of the scoreboard register 52. In particular, the appropriate unavailable bit (e.g., bit 188) is set when a special IPR writer is sent to the issuing/queuing circuitry 44. The data processor is configurable such that the unavailable bits are cleared after the special IPR writer issues. For example, such operation is preferable for IPR writers that write to a translation lookaside buffer (TLB) when the data processor operates in a single CPU configuration. The TLB stores virtual to physical memory translations for virtual memory access instructions. The TLB is a structure that must be accessed frequently and efficiently with minimal disruption to the execution flow of the pipeline. The TLB operation is optimized since, after an initial IPR writer that writes to the TLB issues, and after the control logic 56 of the ordering circuitry 42 clears the unavailable bit, another IPR writer that writes to the TLB can set the unavailable bit and issue without having to wait for the initial IPR writer to retire.

The data processor is further configurable such that the appropriate unavailable bits of the supplemental scoreboard register 52 are cleared after the special IPR writer retires and a memory system clear signal (not shown) has been received by the data processor. Such operation is preferable for IPR writers that write to the TLB when the data processor operates in a multi CPU configuration. In this configuration, it is preferable to wait until the IPR writer has retired and the memory system clear signal is received so that the data processor is guaranteed that it is synchronized with other data processors in the multi CPU configuration. For example, in a multi CPU configuration, page table load instructions are treated as special IPR writers to allow the multi CPU configuration to provide what is called a lightweight memory barrier that allows CPUs to continue processing instructions even when one CPU encounters an explicit memory barrier instruction.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, the invention has been described using the data processor's IPRs. The invention can be applied to the data processor's GPRs as well.

Furthermore, the IPR group identification field of the IPR writers can be removed. The decoding circuitry can then decode the IPR instruction opcode to determine the IPR groups that would be affected by executing the IPR writer in a manner similar to that for the IPR readers that do not have an IPR group identification field.

What is claimed is:

1. A method for processing register instructions in a data processor in which multiple instructions are processed concurrently, and therefore in which concurrent processing of certain register instructions causes a conflict between instructions, the method comprising the steps of:

receiving a register instruction;

identifying which of a plurality of register groups to which the register instruction is assigned, each register group including processor registers that are affected by execution of the register instruction; and controlling progress of the execution of the register instruction depending upon the identified register groups for the register instruction, in order to avoid conflicts with other concurrently processed instructions, through the further steps of:

comparing the identified resister groups with register groups affected by the other concurrently processed instructions to determine one or more affected register groups;

delaying the execution of the register instruction when a match exists between the identified register groups and the affected register groups; and executing the register instruction when no match exists between the identified register groups and the affected register groups.

2. The method of claim 1 wherein the step of identifying includes the step of:

identifying multiple register groups for the register instruction from the plurality of register groups.

3. The method of claim 1 wherein the register instructions write to an internal processor register when executed, and wherein the method further comprises the step of:

notifying subsequently received register instructions when the identified register groups are affected by the execution of the register instruction.

4. The method of claim 3 wherein the step of notifying includes the step of:

updating a scoreboard register before issuing the register instruction to indicate that the identified register groups are affected by the execution of the register instruction.

5. The method of claim 4 wherein the step of notifying further includes the step of:

updating the scoreboard register after executing the register instruction to indicate that the identified register groups no longer are affected by the execution of the register instruction.

6. The method of claim 4 wherein the step of notifying further includes the step of:

updating the scoreboard register after retiring the register instruction to indicate that the identified register groups no longer are affected by the execution of the register instruction.

7. The method of claim 1 wherein the register instruction writes to an internal processor register when the register instruction is executed, and wherein the step of controlling includes the step of:

executing the register instruction by writing to a latch and subsequently moving contents of the latch to the internal processor register.

8. The method of claim 1 wherein the register instruction reads from an internal processor register when the register instruction is executed, and wherein the method further comprises the step of:

assigning a mask to the register instruction, and updating the mask to indicate the identified register groups affected by the execution of the register instruction; and updating a reference register to notify subsequently received register instructions that write to internal processor registers when the identified register groups are affected by the execution of the register instruction.

9. The method of claim 8 wherein a set of masks are assigned to concurrent instructions that read from internal processing registers, and wherein the step of updating the reference register to notify the subsequently received register instructions includes the step of:

adding the assigned mask to the set of masks before the register instruction is executed, and subsequently updating the reference register according to the set of masks.

10. The method of claim 9 wherein the step of updating the reference register to notify the subsequently received register instructions further includes the step of:

removing the assigned mask from the set of masks after the register instruction is executed, and subsequently updating the reference register.

11. A data processor for processing register instructions in which multiple instructions are processed concurrently and therefore in which concurrent processing of certain register instructions causes a conflict between instructions, the data processor comprising:

a decoding circuit, for receiving a register instruction and identifying which of a plurality of register groups to which the register instruction is assigned, each register group including processor registers that are affected by execution of the register instruction; and an instruction ordering circuit, for controlling progress of execution of the register instruction depending upon the identified register groups for the register instruction, in order to avoid conflicts with other concurrently processed instructions, such that the control circuit compares the identified register groups with register groups affected by the other concurrently processed instructions to determine one or more affected register groups, and delays the execution of the register instruction when a match exists between the identified register groups and the affected register groups; and wherein the data processor further comprises an execution unit that executes the register instruction when no match exists between the identified register groups and the affected register groups.

12. The data processor of claim 11 wherein the decoding circuit is adapted to identify multiple register groups for the register instruction from the plurality of register groups.

13. The data processor of claim 11 wherein the ordering circuit includes a control circuit that compares the identified register groups with register groups affected by the other concurrently processed instructions to determine one or more affected register groups, and delays the execution of the register instruction when a match exists between the identified register groups and the affected register groups; and wherein the data processor further comprises an execution unit that executes the register instruction when no match exists between the identified register groups and the affected register groups.

14. The data processor of claim 11 wherein the register instruction writes to an internal processor register when the register instruction is executed, and wherein the ordering circuit is adapted to notify subsequently received register instructions when the identified register groups are affected by the execution of the register instruction.

15. The data processor of claim 14 wherein the ordering circuit further includes:

a scoreboard register coupled with a control circuit, the control circuit being adapted to update the scoreboard register before issuing the register instruction, to indicate that the identified register groups are affected by the execution of the register instruction.

16. The data processor of claim 15 wherein the control circuit of the ordering circuit is further adapted to update the scoreboard register after executing the register instruction, to indicate that the identified register groups no longer are affected by the execution of the register instruction.

17. The data processor of claim 15 wherein the control circuit of the ordering circuit is further adapted to update the scoreboard register after retiring the register instruction, to indicate that the identified register groups no longer are affected by the execution of the register instruction.

18. The data processor of claim 11 wherein the register instruction writes to an internal processor register when the register instruction is executed, and wherein the data processor further comprises:

an execution unit that executes the register instruction by writing to a latch, and subsequently moving contents of the latch to the internal processor register.

19. The data processor of claim 11 wherein the register instruction reads from an internal processor register when the register instruction is executed, and wherein the data processor further comprises:

an issue circuit that assigns a mask to the register instruction, and updates the mask to indicate the identified register groups affected by the execution of the register instruction, wherein the ordering circuit further includes a reference register; and wherein a control circuit is adapted to update a reference register to notify subsequently received register instructions that write to internal processor registers when the identified register groups are affected by the execution of the register instruction.

20. The data processor of claim 19 wherein issue circuit includes:

a set of masks that are assigned to concurrent instructions that read from internal processing registers, the issue circuit being adapted to add the assigned mask to the set of masks before the register instruction is executed, and subsequently update the reference register according to the set of masks.

21. The data processor of claim 20 wherein the issue circuit is further adapted to remove the assigned mask from the set of masks after the register instruction is executed, and subsequently update the reference register.

* * * * *